(12) United States Patent
Jung et al.

(10) Patent No.: US 8,045,495 B2
(45) Date of Patent: Oct. 25, 2011

(54) APPARATUS AND METHOD FOR RESOURCE ALLOCATION FOR MULTICAST DATA IN BROADBAND WIRELESS ACCESS SYSTEM

(75) Inventors: Young-Ho Jung, Suwon-si (KR); Cheol-Woo You, Seoul (KR)

(73) Assignee: Samsung Electronics Co., Ltd (KR)

( * ) Notice: Subject to any disclaimer, the term of this patent is extended or adjusted under 35 U.S.C. 154(b) by 965 days.

(21) Appl. No.: 11/933,968

(22) Filed: Nov. 1, 2007

(65) Prior Publication Data

US 2008/0101269 A1    May 1, 2008

(30) Foreign Application Priority Data

Nov. 1, 2006   (KR) .................. 10-2006-0107140

(51) Int. Cl.
*H04H 20/71* (2008.01)
(52) U.S. Cl. .................. 370/312; 370/329; 370/432
(58) Field of Classification Search .................. 370/310, 370/389, 432, 329, 312, 390, 338, 229, 336; 455/101, 69, 561, 509, 550.1
See application file for complete search history.

(56) References Cited

U.S. PATENT DOCUMENTS

| | | | | |
|---|---|---|---|---|
| 2002/0099854 A1* | 7/2002 | Jorgensen | ................ | 709/249 |
| 2003/0195979 A1* | 10/2003 | Park | ................ | 709/231 |
| 2004/0202164 A1* | 10/2004 | Hooper et al. | ................ | 370/390 |
| 2005/0078641 A1* | 4/2005 | Kim | ................ | 370/335 |
| 2005/0117536 A1* | 6/2005 | Cho et al. | ................ | 370/328 |
| 2005/0135291 A1* | 6/2005 | Ketchum et al. | ................ | 370/319 |
| 2005/0197126 A1* | 9/2005 | Kang et al. | ................ | 455/442 |
| 2006/0262873 A1* | 11/2006 | Johansson | ................ | 375/261 |
| 2007/0173269 A1* | 7/2007 | Laroia et al. | ................ | 455/500 |

FOREIGN PATENT DOCUMENTS

| | | |
|---|---|---|
| EP | 1 603 356 | 12/2005 |
| KR | 1020050038977 | 4/2005 |
| KR | 1020060030783 | 4/2006 |

* cited by examiner

*Primary Examiner* — Hassan Phillips
*Assistant Examiner* — Anez Ebrahim
(74) *Attorney, Agent, or Firm* — The Farrell Law Firm, P.C.

(57) ABSTRACT

Provided is an apparatus and method for resource allocation for multicast data in a broadband wireless access system. In the method, multicast packets are scheduled. Thereafter, a resource allocation message for the scheduled multicast packets divided into a second multicast resource allocation message including information of a user group using a multicast ID and a first multicast resource allocation message including information transmitted in common to users of the user group, and the corresponding message including changed information is transmitted for a change of information. Therefore, it is possible to reduce a waste of resource that is due to the duplicate transmission of some fields of resource allocation information about multicast data.

14 Claims, 6 Drawing Sheets

| SYNTAX | SIZE | NOTES |
|---|---|---|
| DL_MAP_IE() { | – | – |
| DIUC | 4 BITS | OPERATION MODE FOR ALLOCATED RESOURCE |
| IF(DIUC==14) { | – | – |
| EXTENDED-2 DIUC DEPENDENT IE | – | – |
| } ELSE IF(DIUC==15) { | – | – |
| EXTENDED DIUC DEPENDENT IE | VARIABLE | SEE SUBCLAUSES FOLLOWING 8.4.5.3.1. |
| } ELSE { | – | – |
| IF(INC_CID==1) { | – | THE DL-MAP STARTS WITH INC_CID=0;INC_CID IS TOGGLED BETWEEN 0 AND 1 BY THE CID_SWITCH_IE()(8.4.5.3.7) |
| N_CID | 8 BITS | NUMBER OF CIDs |
| FOR(n=0;n<N_CID;n++) { | – | – |
| IF(INCLUDED IN SUB_DL_UL_MAP) { | – | – |
| RCID_IE() | – | FOR SUB-DL-MAP REDUCED CID FORMAT IS USED |
| } ELSE { | – | – |
| CID | 16 BITS | TERMINAL CID ALLOCATED CORRESPONDING RESOURCE |
| } | – | – |
| } | | |
| OFDMA SYMBOL OFFSET | 8 BITS | POSITION OF ALLOCATED RESOURCE |
| IF(PERMUTATION=0B11 AND(AMC TYPE IS 2x3 OR 1x6)) { | | |
| SUBCHANNEL OFFSET | 8 BITS | |
| BOOSTING | 3 BITS | 000:NORMAL(NOT BOOSTED); 001:+6dB;010:-6dB;011:+9dB; 100:+3dB;101:-3dB;110:-9dB; 111:-12dB; |
| | 22 | |
| NO.OFDMA TRIPLE SYMBOL | 5 BITS | NUMBER OF OFDMA SYMBOLS IS GIVEN IN MULTIPLES OF 3 SYMBOLS |
| NO.SUBCHANNELS | 6 BITS | |
| } ELSE { | OR | |
| SUBCHANNEL OFFSET | 6 BITS | |
| BOOSTING | 3 BITS | 000:NORMAL(NOT BOOSTED); 001:+6dB;010:-6dB;011:+9dB; 100:+3dB;101:-3dB;110:-9dB; 111:-12dB; |
| | 22 | |
| NO.OFDMA SYMBOLS | 7 BITS | |
| NO.SUBCHANNELS | 6 BITS | |
| } | | |
| REPETITION CODING INDICATION | 2 BITS | 0B00-NO REPETITION CODING 0B01-REPETITION CODING OF 2 USED 0B10-REPETITION CODING OF 4 USED 0B11-REPETITION CODING OF 6 USED |
| } | | |
| } | | |

FIG.1
(PRIOR ART)

TABLE 68 F-SSCH BLOCKS

| BLOCK NAME | HEADER (BINARY) | LENGTH (BITS) | FIELDS | [#BITS] |
|---|---|---|---|---|
| ACCESSGRANT | 0000 | $6 + N_{MACID} + N_{RL\_NODEID} + N_{FRID}$ | MACID<br>NODEID<br>FRAMERESID<br>TIMING ADJUST | $[N_{MACID}]$<br>$[N_{RL\_NODEID}]$<br>$[N_{FRID}]$<br>[6] |
| NS-FLAB | 0001 | $9 + N_{MACID} + N_{RL\_NODEID}$ | MACID<br>NODEID<br>PF<br>DURATION<br>EXTENDED TRANSMISSION | $[N_{MACID}]$<br>$[N_{RL\_NODEID}]$<br>[6]<br>[2]<br>[1] |
| NS-MCWFLAB1 | 0010 | $8 + N_{MACID} + N_{RL\_NODEID}$ | MACID<br>NODEID<br>PFLAYER1<br>DURATION<br>EXTENDED TRANSMISSION | $[N_{MACID}]$<br>$[N_{RL\_NODEID}]$<br>[5]<br>[2]<br>[1] |
| NS-MCWFLAB2 | 0011 | $N_{MACID} + 4*(N_{EPE\_TX\_ANT} - 1)$ | MACID<br>PFLAYER1<br>...<br>PFLAYER$N_{EPE\_TX\_ANT}$ | $[N_{MACID}]$<br>[4]<br><br>[4] |
| NS-SCWFLAB | 0100 | $10 + N_{MACID} + N_{FL\_NODEID}$ | MACID<br>NODEID<br>PF<br>NUMLAYERS<br>DURATION<br>EXTENDED TRANSMISSION | $[N_{MACID}]$<br>$[N_{FL\_NODEID}]$<br>[5]<br>[2]<br>[2]<br>[1] |
| FLAB | 0101 | $8 + N_{MACID} + N_{FL\_NODEID}$ | MACID<br>NODEID<br>PF<br>EXTENDED TRANSMISSION<br>SUPPLEMENTAL | $[N_{MACID}]$<br>$[N_{FL\_NODEID}]$<br>[6]<br>[1]<br>[1] |
| MCWFLAB1 | 0110 | $6 + N_{MACID} + N_{FL\_NODEID}$ | MACID<br>NODEID<br>PFLAYER1<br>EXTENDED TRANSMISSION<br>SUPPLEMENTAL | $[N_{MACID}]$<br>$[N_{FL\_NODEID}]$<br>[5]<br>[1]<br>[1] |
| MCWFLAB2 | 0111 | $N_{MACID} + 4*(N_{EPE\_TX\_ANT} - 1)$ | MACID<br>PFLAYER2<br>...<br>PFLAYER$N_{EPE\_TX\_ANT}$ | $[N_{MACID}]$<br>[4]<br><br>[4] |

FIG. 2A
(PRIOR ART)

TABLE 68 F-SSCH BLOCKS

| BLOCK NAME | HEADER (BINARY) | LENGTH (BITS) | FIELDS | [#BITS] |
|---|---|---|---|---|
| SCWFLAB | 1000 | $9+N_{MACID}+N_{FL\_NODEID}+$ | MACID<br>NODEID<br>PE<br>NUMLAYERS<br>EXTENDED TRANSMISSION<br>SUPPLEMENTAL | $[N_{MACID}]$<br>$[N_{FL\_NODEID}]$<br>[5]<br>[2]<br>[1]<br>[1] |
| RLAB | 1001 | $10+N_{MACID}+N_{RL\_NODEID}+N_{FRID}$ | MACID<br>NODEID<br>FRAMERESID<br>PF<br>EXTENDED TRANSMISSION<br>SUPPLEMENTAL<br>DELTA | $[N_{MACID}]$<br>$[N_{RL\_NODEID}]$<br>$[N_{FRID}]$<br>[5]<br>[1]<br>[1]<br>[3] |
| NS-RLAB | 1010 | $8+N_{MACID}+N_{RL\_NODEID}+N_{FRID}$ | MACID<br>NODEID<br>FRAMERESID<br>PF<br>DURATION<br>EXTENDED TRANSMISSION<br>DELTA | $[N_{MACID}]$<br>$[N_{RL\_NODEID}]$<br>$[N_{FRID}]$<br>[5]<br>[1]<br>[1]<br>[3] |
| CCB | 1011 | $6+N_{MACID}$ | MACID<br>ACTIVECARRIERSCHANGE<br>REQCARRIERCHANGE | $[N_{MACID}]$<br>[4]<br>[2] |
| FLAB-HO | 1100 | $10+N_{MACID}+N_{FL\_NODEID}$ | MACID<br>NODEID<br>PF<br>EXTENDED TRANSMISSION<br>DESIREDSECTOR | $[N_{MACID}]$<br>$[N_{FL\_NODEID}]$<br>[6]<br>[1]<br>[3] |
| RLAB-HO | 1101 | $9+N_{MACID}+N_{RL\_NODEID}+N_{FRID}$ | MACID<br>NODEID<br>FRAMERESID<br>PF<br>EXTENDED TRANSMISSION<br>DESIREDSECTOR | $[N_{MACID}]$<br>$[N_{RL\_NODEID}]$<br>$[N_{FRID}]$<br>[5]<br>[1]<br>[3] |

APPARATUS AND METHOD FOR RESOURCE ALLOCATION FOR MULTICAST DATA IN BROADBAND WIRELESS ACCESS SYSTEM

PRIORITY

This application claims priority under 35 U.S.C. §119 to an application filed in the Korean Intellectual Property Office on Nov. 1, 2006 and allocated Serial No. 2006-0107140, the contents of which are incorporated herein by reference.

BACKGROUND OF THE INVENTION

1. Field of the Invention

The present invention relates generally to a Broadband Wireless Access (BWA) system, and in particular, to an apparatus and method for resource allocation for multicast data in a BWA system.

2. Description of the Related Art

Communication systems have been primarily developed for voice communication services, but they are also evolving to provide data services and various multimedia services. However, conventional communication systems, which are mainly directed to providing voice communication services, still have a narrow data transmission bandwidth and require a high subscription fee. For these reasons, they cannot satisfy diversified user demands. Furthermore, in line with rapid development in the communication industry and ever-increasing demands on Internet services, it is important to provide communication systems capable of providing Internet services efficiently. As a result of these trends, BWA systems having a bandwidth large enough to satisfy both the increasing user demands and provide efficient Internet services have been proposed.

In addition to providing voice communication services, BWA systems also aim at supporting a variety of low-speed and high-speed data services and multimedia application services (e.g., high-quality moving pictures) in combination. BWA systems are based on wireless media using a broadband of 2 GHz, 5 GHz, 26 GHz, 60 or GHz and are able to access a Public Switched Telephone Network (PSTN), Public Switched Data Network (PSDN), Internet network, International Mobile Telecommunications-2000 (IMT-2000) network, and Asynchronous Transfer Mode (ATM) network in a mobile or stationary environment. In other words, BWA systems can support a channel transmission rate of at least 2 Mbps. BWA systems may be classified into broadband wireless local loops, broadband mobile access networks, and high-speed wireless Local Area Networks (LANs) according to the terminal's mobility (stationary or mobile), communication environment (indoor or outdoor), and channel transmission rate.

The standardization of wireless access schemes of BWA systems is being conducted by the Institute of Electrical and Electronics Engineers (IEEE), which is one of the international standardization organizations, particularly by IEEE 802.16 and IEEE 802.20 standardization groups. The BWA systems use an Orthogonal Frequency Division Multiplexing (OFDM)/Orthogonal Frequency Division Multiple Access (OFDMA) scheme for physical channels. That is, the BWA systems use an OFDM/FDMA scheme to transmit physical channel signals over subcarriers, thereby enabling high-speed data transmission.

The BWA system reports resource allocation information by transmitting information, such as the size of resource allocated to each user and an operation mode used for transmission of the corresponding resource, using broadcast channels such as a MAP channel and a shared (common) signaling channel. The resource allocation information indicates which resource is allocated to which user. The operation mode information includes a channel coding type, a coding rate, a modulation scheme, a packet length, a hybrid automatic repeat request (HARQ) type, and a multi-input multi-output (MIMO) scheme. TX data can be classified into unicast data transmitted to one user, multicast data transmitted to two or more users, and broadcast data transmitted to all users.

Schemes used for the transmission of the resource allocation information can be classified into a one-to-all resource allocation information transmission scheme and a one-to-one resource allocation information transmission scheme. The one-to-all resource allocation information transmission scheme transmits resource allocation information about all users using one encoding block to serially report the resource allocation information about all the users, which is adopted in the IEEE 802.16e standard. The size of the encoding block is transmitted over another broadcast channel. The one-to-one resource allocation information transmission scheme allocates resources using a plurality of small-sized encoding blocks. The number of the small-sized encoding block is transmitted over a separate broadcast channel.

Figure 1:
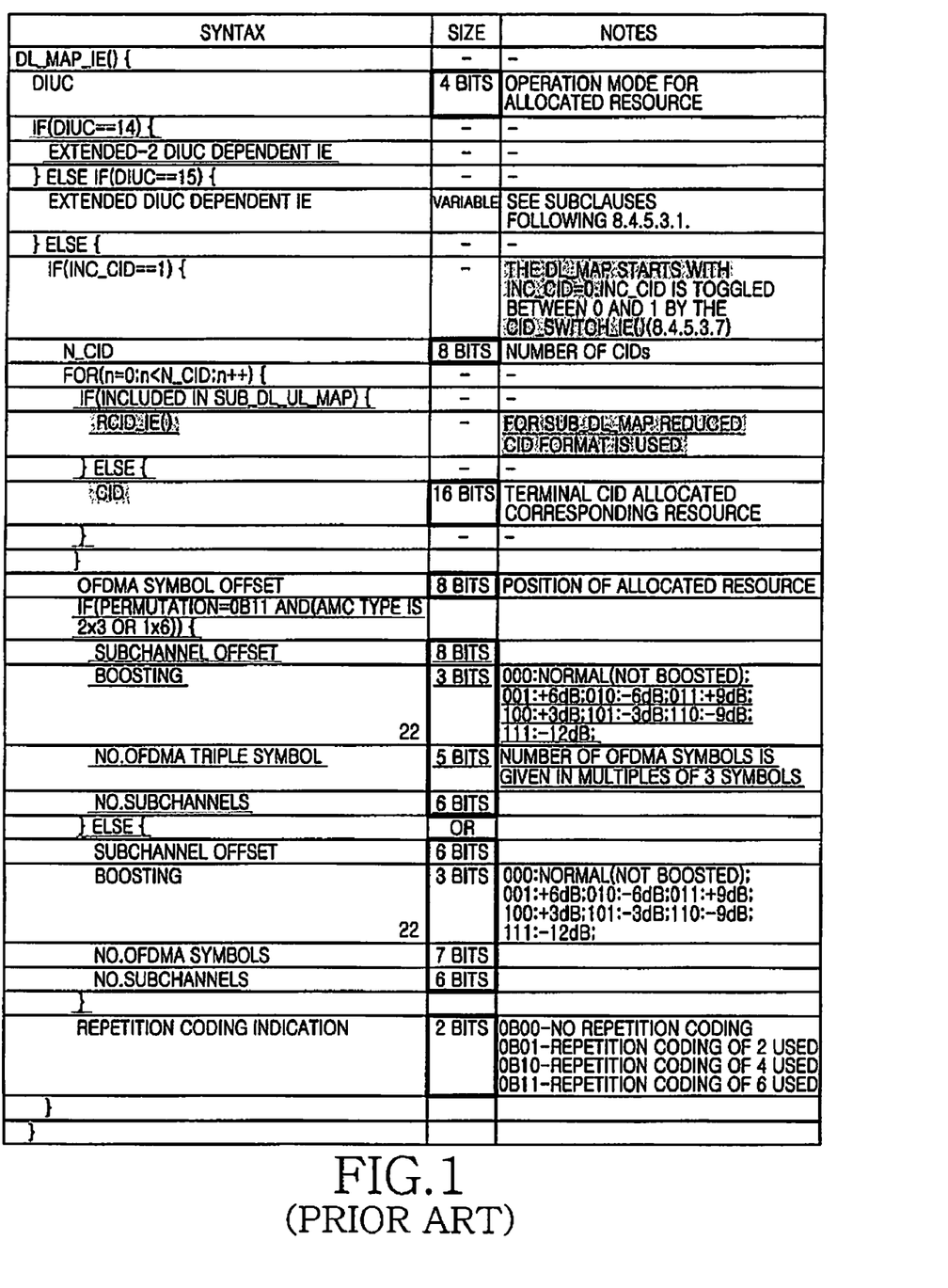
FIG. 1 is a table showing an exemplary format of a resource allocation message in the conventional IEEE 802.16e system.

In the one-to-all resource allocation information transmission scheme, a resource allocation message in the IEEE 802.16e system is formatted as illustrated in FIG. 1. Referring to FIG. 1, the number of terminal Connection IDs (CIDs) included in the resource allocation message is variable and the length of the resource allocation message is the sum of a fixed length of 44 bits and a variable length of 16×N_CID depending on the number of CIDs. The fixed length of 44 bits is the sum of bits of a Downlink Interval Usage Code (DIUC) (4 bits) indicating an operation mode for an allocated resource, an N_CID (8 bits) indicating the number of CIDs, an OFDMA symbol offset (8 bits) indicating the position of the allocated resource, a subchannel offset (8 bits/6 bits), a boosting (3 bits), the number of OFDMA triple symbols (5 bits/7 bits), the number of subchannels (6 bits), and a repetition coding indication (2 bits). Thus, the one-to-all resource allocation information transmission scheme is advantageous for multicast information allocation. However, because the one-to-all resource allocation information transmission scheme transmits the resource allocation information about all the users simultaneously at the start point of a frame in a time division multiplexing (TDM) scheme, power control is impossible and a TX latency such as for HARQ increases due to an increase in a scheduling period.

Figure 2A:
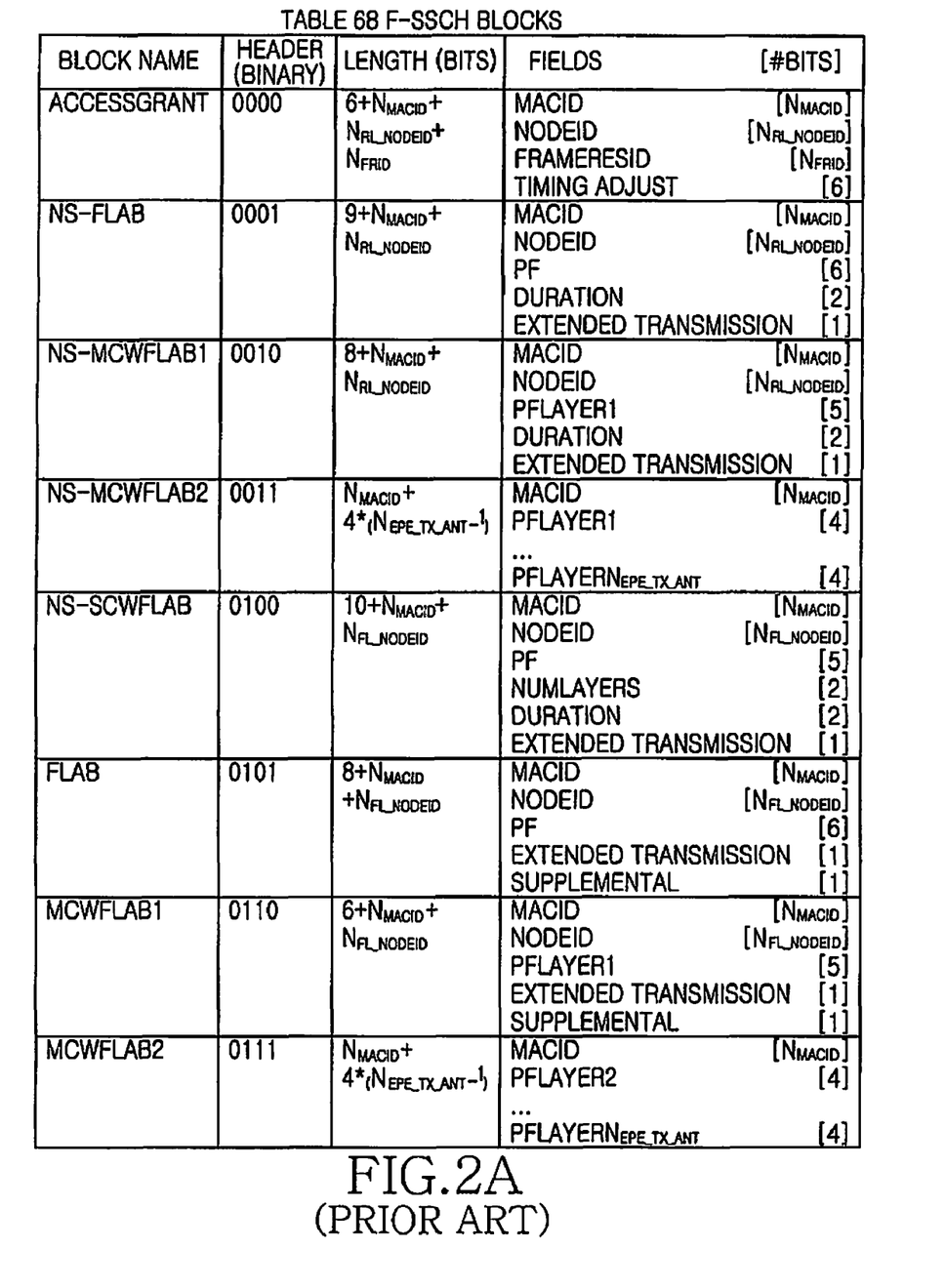
FIGS. 2A and 2B are a table showing an exemplary format of a resource allocation message in the conventional IEEE 802.20 system.
Figure 2B:
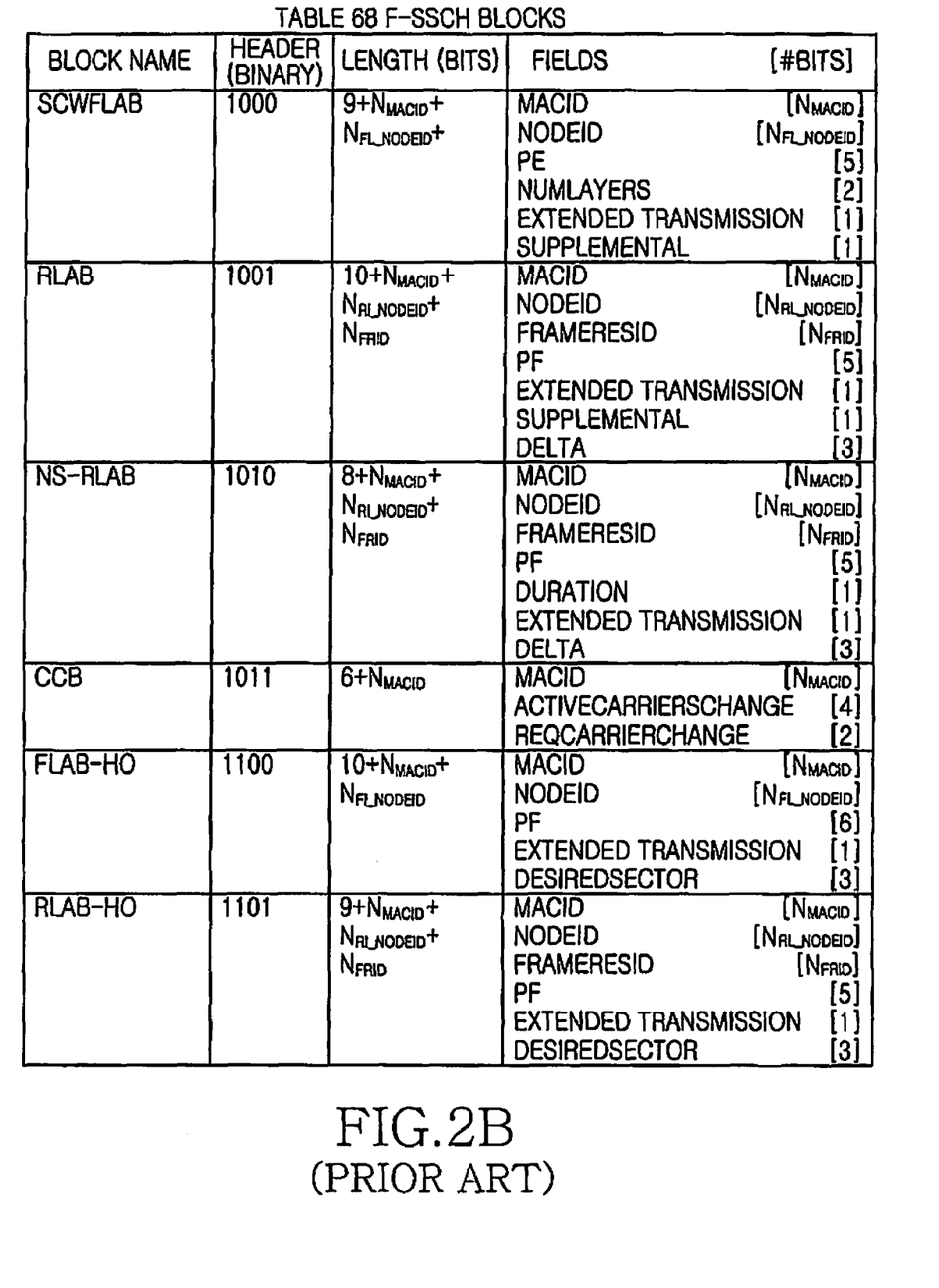

In order to solve the above drawbacks, the one-to-one resource allocation information transmission scheme transmits resource allocation information using an encoding block in units of the resource allocation information, which is proposed in the IEEE 802.20 draft standard. FIGS. 2A and 2B are tables showing an exemplary format of a resource allocation message in the IEEE 802.20 system.

Referring to FIGS. 2A and 2B, the one-to-one resource allocation information transmission scheme can allocate only one Media Access Control ID (MACID) (i.e., CID) to identify a terminal to one block. Thus, if resources are to be allocated to two or more users, that is, if resources are to be allocated for multicast data, resource allocation information blocks of the same type and equal in number to the number of users (i.e., MACIDs) are to be transmitted, leading to a waste of resource. For example, if Non-Sticky Forward Link Assignment Block (NS-FLAB) type information is allocated to four users, four NS-FLAB blocks with different MACIDs are to be generated and transmitted as shown in Tables 1 through 4. The NS-FLAB is a kind of IEEE 802.20 downlink resource allocation message, which is used to allocate a specific resource to a specific user only for a predetermined time. Herein, the Link Assignment Block (LAB) is the basic unit of an IEEE 802.20 resource allocation message.

TABLE 1

| Field | Value |
|---|---|
| Header (4 bits) | 0001 |
| MACID (11 bits) | 01101100101 |
| NodeID (6 bits) | 011011 |
| PF (6 bits) | 110110 |
| Duration (2 bits) | 00 |
| Extended Transmission (1 bit) | 0 |
| Reserved (2 bits) | — |
| CRC (16 bits) | Calculated CRC |

TABLE 2

| Field | Value |
|---|---|
| Header (4 bits) | 0001 |
| MACID (11 bits) | 010100100010 |
| NodeID (6 bits) | 011011 |
| PF (6 bits) | 110110 |
| Duration (2 bits) | 00 |
| Extended Transmission (1 bit) | 0 |
| Reserved (2 bits) | — |
| CRC (16 bits) | Calculated CRC |

TABLE 3

| Field | Value |
|---|---|
| Header (4 bits) | 0001 |
| MACID (11 bits) | 00001010001 |
| NodeID (6 bits) | 011011 |
| PF (6 bits) | 110110 |
| Duration (2 bits) | 00 |
| Extended Transmission (1 bit) | 0 |
| Reserved (2 bits) | — |
| CRC (16 bits) | Calculated CRC |

TABLE 4

| Field | Value |
|---|---|
| Header (4 bits) | 0001 |
| MACID (11 bits) | 11100110011 |
| NodeID (6 bits) | 011011 |
| PF (6 bits) | 110110 |
| Duration (2 bits) | 00 |
| Extended Transmission (1 bit) | 0 |
| Reserved (2 bits) | — |
| CRC (16 bits) | Calculated CRC |

As shown in Tables 1 through 4, a resource allocation information block includes a Header field that indicates the type of a resource allocation message, a MACID field that indicates an ID managed by a base station for discrimination between user terminals, a NodeID field that indicates a communication resource ID, a Packet Format (PF) field that indicates information about the combination of operation modes of data transmitted through the communication resources, a Duration field that indicates the duration of resource allocation, an Extended Transmission field that indicates the size of a resource allocation unit, a Reserved field that indicates dummy bits used to equalize the total message length in case of a component change in a resource allocation message block, and a Cyclic Redundancy Check (CRC) field that is used to check if there is a channel decoding error. In this case, even except for the bits of the CRC field and the Reserved field, 57 (=19×3) bits are wasted because information of the Header field, the NodeID field, the PF field, the Duration field, and the Extended Transmission field are transmitted four times. Moreover, if another packet is to be transmitted to the same four users, all of the four resource allocation information blocks must be transmitted again.

SUMMARY OF THE INVENTION

Therefore there is a need for an efficient resource allocation information transmission method for reducing a waste of resource that is due to the duplicate transmission of some fields of the resource allocation information about multicast data in the one-to-one resource allocation information transmission system scheme.

An object of the present invention is to substantially solve at least the above problems and/or disadvantages and to provide at least the advantages below. Accordingly, an object of the present invention is to provide an apparatus and method for resource allocation for multicast data in a BWA.

Another object of the present invention is to provide an apparatus and method for transmitting a resource allocation message for multicast data in a BWA system, with the resource allocation message divided into a message for a change of information about a user group using a specific multicast ID and a message for a change of a PF or a node ID for the specific multicast ID.

Still another object of the present invention is to provide an apparatus and method for resource allocation for multicast data in a BWA system, which can achieve an additional gain in the case of a repetition of a transmission for a specific user group while reducing a waste of resource that is due to the duplicate transmission of some fields of resource allocation information about multicast data.

According to an aspect of the present invention, a method for resource allocation for multicast data in a wireless access system includes scheduling multicast packets; and dividing a resource allocation message for the scheduled multicast packets into a second multicast resource allocation message including information of a user group using a multicast ID and a first multicast resource allocation message including information transmitted in common to users of the user group, and transmitting the corresponding message including changed information for a change of information.

According to another aspect of the present invention, an apparatus for resource allocation for multicast data in a wireless access system includes a scheduler for scheduling multicast packets and outputting changed information if a change of resource allocation information is necessary for each multicast ID; and a resource allocation message generator for generating, upon receipt of information of a user group using the multicast ID from the scheduler, a second multicast resource allocation message including the received user group information and generating, upon receipt of information transmitted in common to users of the user group, a first multicast resource allocation message including the information transmitted in common.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, a description is given of an apparatus and method for resource allocation for multicast data in a BWA system according to the present invention.

According to the present invention, all of resource allocation information is not included in one resource allocation message for multicast data. For example, a resource allocation message for multicast data is divided into a second multicast resource allocation message including information of a user group using a multicast ID and a first multicast resource allocation message including information (e.g., operation mode information and resource information) transmitted in common to users of the user group. This prevents a waste of resource that is due to the duplicate transmission of information.

Figure 3:
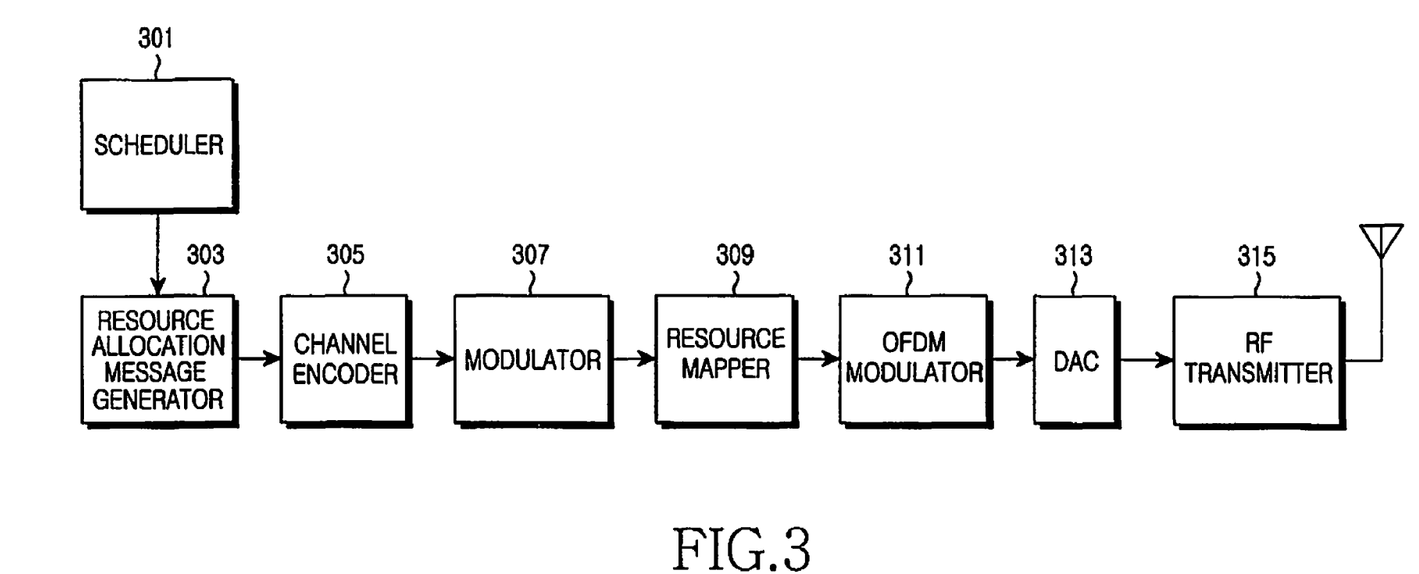
FIG. 3 is a block diagram of a base station in a BWA system according to an embodiment of the present invention.

FIG. 3 is a block diagram of a base station in a BWA system according to an embodiment of the present invention.

Referring to FIG. 3, the base station includes a scheduler 301, a resource allocation message generator 303, a channel encoder 305, a modulator 307, a resource mapper 309, an OFDM modulator 311, a Digital-to-Analog Converter (DAC) 313, and a Radio Frequency (RF) transmitter 315.

The scheduler 301 performs resource allocation using channel information (e.g., Channel Quality Information (CQI) information) for each user terminal, fed back through a feedback channel (e.g., a CQI channel), and outputs the resource allocation information to the resource allocation message generator 303. Also, when it is necessary to change information about a user group of a specific multicast ID for a multicast packet among packets allocated resources, the scheduler 301 outputs information about the user to the resource allocation message generator 303. Also, when it is necessary to change resource information and operation mode information of a specific multicast ID, the scheduler 301 outputs the resource information and the operation mode information to the resource allocation message generator 303.

The resource allocation message generator 303 generates a resource allocation message using the resource allocation information received from the scheduler 301, and outputs the generated resource allocation message to the channel encoder 305. Also, when information about a specific user is received from the scheduler 301 for a change of a specific multicast ID, the resource allocation message generator 303 generates a second multicast resource allocation message using the received user information. Also, when operation mode information and resource information are received from the scheduler 301 for a change of resource information and operation mode information about multicast information of a specific multicast ID, the resource allocation message generator 303 generates a first multicast resource allocation message using the received operation mode information and resource information.

The channel encoder 305 encodes an information bit stream, received from the resource allocation message generator 303, to generate code symbols, and outputs the generated code symbols to the modulator 307. Examples of the channel encoder 305 are an encoder using a Convolutional Code (CC), an encoder using a Block Turbo Code (BTC), and an encoder using a Convolutional Turbo Code (CTC), a Zero-Tailing Convolutional Code (ZT-CC).

The modulator 307 modulates the code symbols, received from the channel encoder 305, in a predetermined modulation scheme to generate modulation symbols, and outputs the generated modulation symbols to the resource mapper 309. The resource mapper 309 maps data, received from the modulator 307, to a predetermined resource (e.g., the head of a frame) and outputs the resulting data to the OFDM modulator 311. The OFDM modulator to generate an OFDM symbol, and outputs the generated OFDM symbol to the DAC 313. Herein, the OFDM modulation includes Inverse Fast Fourier Transform (IFFT) and Cyclic Prefix (CP) insertion.

The DAC 313 converts sample data, received from the OFDM modulator 311, into an analog signal and outputs the analog signal to the RF transmitter 315. The RF transmitter 315 up-converts a baseband signal, received from the DAC 313, into an RF signal and transmits the RF signal through an antenna. After receipt of the resource allocation information from the base station, user terminals receive/transmit downlink data/uplink data from/to the base station according to the received resource allocation information.

Figure 4:
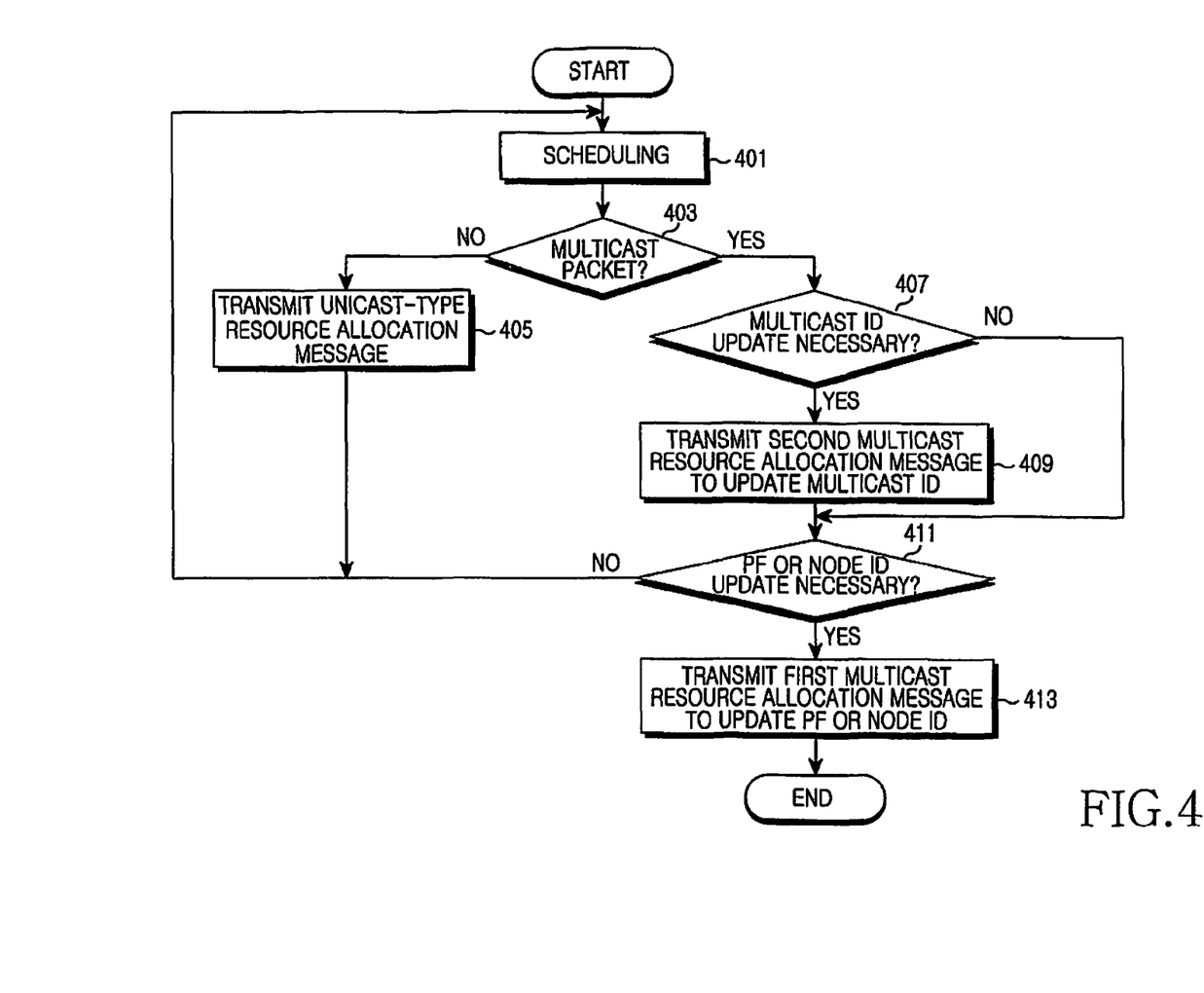
FIG. 4 is a flowchart illustrating a procedure for resource allocation for multicast data in a base station of a BWA system according to an embodiment of the present invention.

FIG. 4 is a flowchart illustrating a procedure for resource allocation for multicast data in the base station of the BWA system according to an embodiment of the present invention.

Referring to FIG. 4, in step 401, the base station performs resource scheduling using channel information (e.g., CQI information) for each user terminal that is fed back through a feedback channel (e.g., a CQI channel). In step 403, the base station determines if there is a multicast packet among the scheduled packets.

If there is no multicast packet determined in step 403, the base station transmits a unicast-type resource allocation message for a unicast packet in step 405 and returns to step 401. If there is a multicast packet determined in step 403, the base station determines if an information change (update) for a user group of a multicast ID is necessary, in step 407. Herein, the information change for the user group of the multicast ID is performed for allocation of a new user for the multicast ID or for deallocation of an allocated user. If the information change for the user group of the multicast ID is not necessary in step 407, the base station proceeds directly to step 411. If the information change for the user group of the multicast ID is necessary in step 407, the base station proceeds to step 409. In step 409, the base station generates and transmits a second multicast resource allocation message to the user terminal to update the multicast ID.

The second multicast resource allocation message is a resource allocation block for a change of information of a user group included in a specific multicast ID, which may be formatted to include parameters shown in Tables 5 and 6.

TABLE 5

| Field | Value |
| --- | --- |
| Header (4 bits) | 1111 |
| MulticastID (4 bits) | 0011 |
| MACID__1 (11 bits) | 01101100101 |
| MACID__1__flag (1 bit) | 0 |
| MACID__2 (11 bits) | 10100100010 |
| MACID__2__flag (1 bit) | 0 |
| CRC (16 bits) | Calculated CRC |

TABLE 6

| Field | Value |
| --- | --- |
| Header (4 bits) | 1111 |
| MulticastID (4 bits) | 0011 |
| MACID__1 (11 bits) | 00001010001 |
| MACID__1__flag (1 bit) | 0 |
| MACID__2 (11 bits) | 11100110011 |
| MACID__2__flag (1 bit) | 0 |
| CRC (16 bits) | Calculated CRC |

As shown in Tables 5 and 6, the second multicast resource allocation message includes a Header field that indicates the type of the resource allocation message, a MulticastID field that indicates an index representing a user group receiving the same multicast data, a MACID (MACID__1, MACID__2) field that indicates an ID managed by a base station for discrimination between users of the user group, a MACID_flag (MACID__1_flag, MACID__2_flag) field that represents an indicator for indicating the new allocation or the deallocation of a MACID allocated to a multicast ID, and a CRC field that is used to check if there is a channel decoding error.

If a MACID is added to a multicast ID, a MACID_flag for each MACID is denoted by '0'; and if a MACID is deallocated (released) from a multicast ID, a MACID_flag for each MACID is denoted by '1', so that a 1-bit indication for the MACID can be performed. More bits can be allocated to a MACID_flag. In this case, if a MACID is allocated continuously until deallocation (release) from a multicast ID, the MACID_flag may be denoted by '00'; if a MACID is allocated for a predetermined duration, the MACID_flag may be denoted by '01'; if a MACID is automatically deallocated (released) after only one-time allocation, the MACID_flag may be denoted by '10'; and if a MACID is deallocated (released), the MACID_flag may be denoted by '11'.

In this case, if an odd number of MACIDs are to be transmitted through the second multicast resource allocation message, a dummy MACID indicating 'No User' may be transmitted in a MACID field that remains after allocation of the odd number of MACIDs. That is, if the number of TX MACIDs to be transmintted is less than the number of MACIDs transmittable through the second multicast resource allocation message, a dummy MACID indicating 'No User' may be transmitted in a MACID field that remains after allocation of the TX MACIDs. Although the second multicast resource allocation message of Tables 5 and 6 has been described on the assumption of including two MACIDs allocated to the multicast ID, it may include a plurality of MACIDs.

In step 411, the base station determines if it is necessary to change operation mode information and resource information about a specific multicast ID such as a PF or node ID. Herein, the change of the resource information and the operation mode information about the multicast ID is performed for the first resource allocation to the multicast ID or for a change of one or more of the PF and ID of an allocated resource. If the change of the resource information and the operation mode information about the multicast ID is not necessary in step 411, the base station returns to step 401. If the change of the resource information and the operation mode information about the multicast ID is necessary, the base station proceeds to step 413. In step 413, the base station generates and transmits a first multicast resource allocation message to the user terminal to update the resource information and the operation mode information about the multicast ID.

The first multicast resource allocation message is a resource allocation block for transmission of the resource information and the operation mode information about the multicast ID, which may be formatted to include parameters shown in Table 7.

TABLE 7

| Field | Value |
| --- | --- |
| Header (4 bits) | 1110 |
| MulticastID (4 bits) | 0011 |
| MulticastID__reset (1 bit) | 0 |
| Original__Header (4 bits) | 0001 |
| *fields depending on the original header | |
| NodeID (6 bits) | 011011 |
| PF (6 bits) | 110110 |
| Duration (2 bits) | 00 |
| Extended Transmission (1 bit) | 0 |
| Reserved (4 bits) | — |
| CRC (16 bits) | Calculated CRC |

As shown in Table 7, the first multicast resource allocation message includes a Header field that indicates the type of the resource allocation message, a MulticastID field that indicates an index representing a user group receiving the same multicast data, a MulticastID_reset field that indicates whether to reset all MACIDs belonging to a multicast ID, an Original_Header field that is used to discriminate between the types of multicast resource allocation messages and corresponds to a header field for unicast communication (see FIGS. 2A and 2B), a NodeID field that indicates a communication resource ID except for an MACID among information transmitted for each block of each type, a PF field that indicates information about the combination of operation modes of data transmitted through the communication resources, a Duration field that indicates the duration of resource allocation, an Extended Transmission field that indicates the size of a resource allocation unit, a Reserved field that indicates dummy bits used to equalize the total message length in case of a component change in a resource allocation message block, and a CRC field that is used to check if there is a channel decoding error. Examples of the operation mode information are a channel coding type, a coding rate, a modulation scheme, a packet length, an HARQ type, and a MIMO scheme.

Based on the Header field of the first multicast resource allocation message received the base station, the user terminal can detect that the corresponding message is the first multicast resource allocation message and that NS-FLAB information is transmitted to a user corresponding to the multicast ID using the above message.

For example, if a multicast packet is to be transmitted to four users, the proposed schemes of the present invention using the resource allocation messages of Tables 5 through 7 may transmit one less block than the conventional scheme using the resource allocation messages of Table 1 through 4. Also, if another multicast packet is to be transmitted to the same four users, the conventional scheme must transmit four blocks but the proposed schemes may retransmit only the first multicast resource allocation message.

If information about a multicast transmission group is volatile, the conventional scheme needs N blocks for allocation of multicast resources to N users but the proposed schemes need only (1+N/2) blocks for allocation of multicast resources to N users. Also, if information about a multicast transmission group is nonvolatile, the conventional scheme needs N blocks for allocation of multicast resources to N users but the proposed schemes need only (1+$N_{change}$/2) blocks for allocation of multicast resources to N users. Herein, $N_{change}$ denotes the number of users to which multicast addition or release information must be transmitted, that is, the number of users with information changed.

Figure 5:
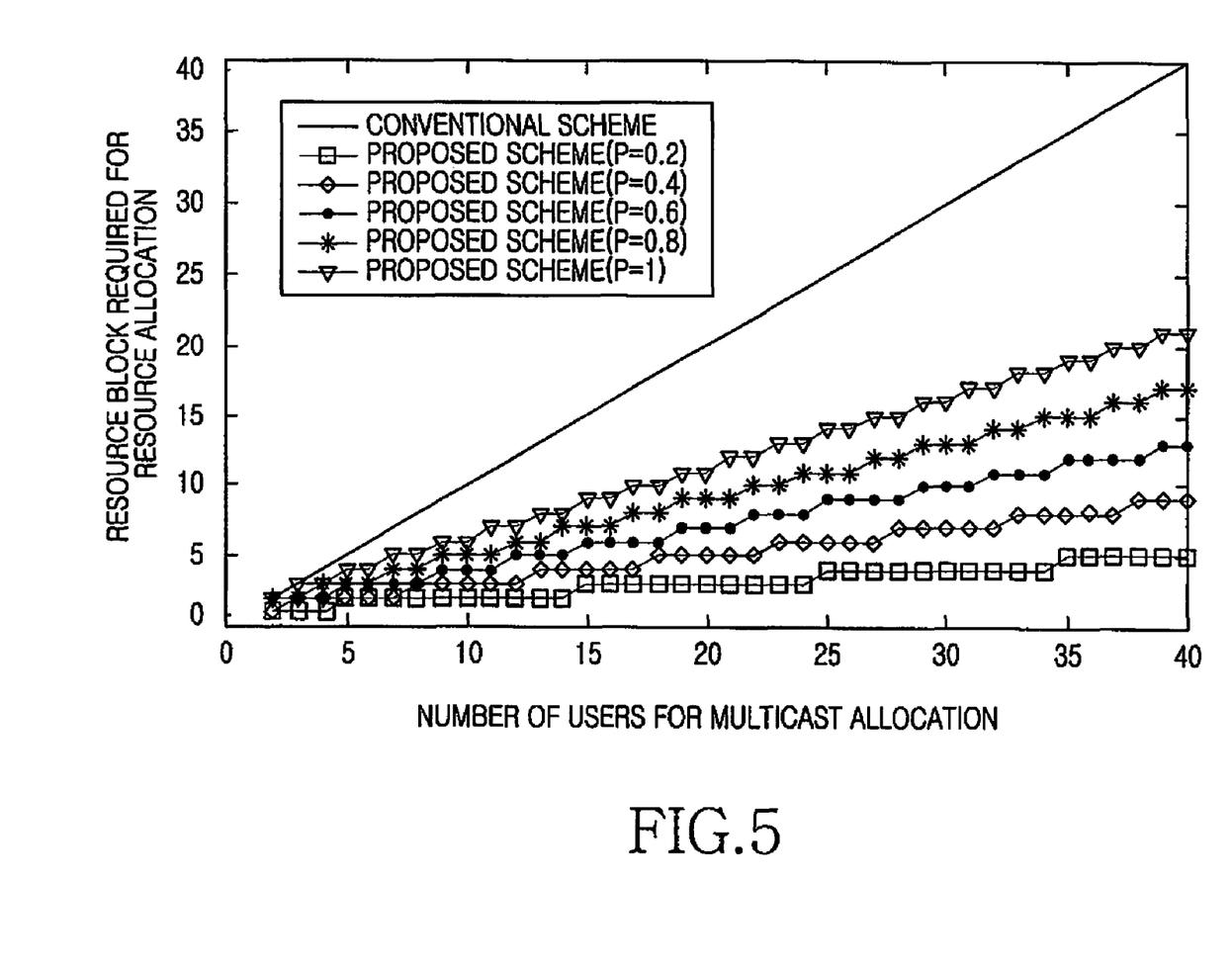
FIG. 5 is a graph comparing the amount of resource allocation information for multicast data according to the conventional scheme and the proposed schemes of the present invention.

FIG. 5 is a graph comparing the amounts of resource allocation information for multicast data according to the conventional scheme and the proposed schemes of the present invention. In FIG. 5, 'P' denotes the probability of a case for a change of a user MACID belonging to a multicast ID, that is, ($N_{change}$/the total user number N).

As can be seen from FIG. 5, compared to the conventional scheme, the use of the present invention schemes can further reduce an overhead for transmission of resource allocation information as the number of multicast users increases.

As described above, the apparatus and method of the present invention transmits a resource allocation message for multicast data in a BWA system, with the resource allocation message divided into a message for a change of information about a user group using a specific multicast ID and a message for change of a PF or a node ID for the specific multicast ID. Therefore, it is possible to reduce a waste of resource that is due to the duplicate transmission of some fields of resource allocation information about multicast data. Also, it is possible to achieve an additional gain in case of repetition of transmission for a specific user group.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for resource allocation for multicast data in a wireless access system, the method comprising: scheduling multicast packets; dividing a resource allocation message for the scheduled multicast packets into a second multicast resource allocation message including information of a user group using a multicast identification (ID) and a first multicast resource allocation message including information transmitted in common to users of the user group; and transmitting the corresponding message including changed information for a change of information, wherein the second multicast resource allocation message includes at least one of a Header field that indicates the type of the resource allocation message, a Multicast ID field that indicates an index representing a user group receiving the same multicast data, Media Access Control ID (MACID) field that indicates an ID managed by a base station for discrimination between users of the user group, a MACID flag field that represents an indicator for indicating the new allocation or the deallocation of a MACID allocated to a multicast ID, and a Cyclic Redundancy Check (CRC) field that is used to determine if there is a channel decoding error.

2. The method of claim 1, wherein the second multicast resource allocation message includes a plurality of MACIDs for the multicast ID.

3. The method of claim 2, wherein if the number of transmit (TX) MACIDs to be transmitted is less than the number of MACIDs transmittable through the second multicast resource allocation message, a dummy MACID indicating 'No User' is transmitted in a MACID field that remains after allocation of the TX MACIDs.

4. The method of claim 1, wherein the first multicast resource allocation message includes at least one of a Header field that indicates the type of the resource allocation message, a MulticastID field that indicates an index representing a user group receiving the same multicast data, a MulticastID_reset field that indicates whether to reset all MACIDs belonging to a multicast ID, an Original_Header field that is used to discriminate between the types of multicast resource allocation messages and corresponds to a header field for unicast communication, a NodeID field that indicates a communication resource ID, a Packet Format (PF) field that indicates information about the combination of operation modes of data transmitted through the communication resources, a Duration field that indicates the duration of resource allocation, an Extended Transmission field that indicates the size of a resource allocation unit, a Reserved field that indicates dummy bits used to equalize the total message length in case of a component change in a resource allocation message block, and a CRC field that is used to determine if there is a channel decoding error.

5. The method of claim 4, wherein the operation mode information includes at least one of a channel coding type, a coding rate, a modulation scheme, a packet length, a Hybrid Automatic Repeat Request (HARQ) type, and a Multi-Input Multi-Output (MIMO) scheme.

6. The method of claim 1, wherein the information change for the user group of the multicast ID is at least one of the information change for allocation of a new user for the multicast ID and the information change for deallocation of an allocated user.

7. The method of claim 1, wherein the change of the information transmitted in common is at least one of the information change for the first resource allocation to the multicast ID and the information change for a change of one or more of a Packet Format (PF) and ID of an allocated resource.

8. An apparatus for resource allocation for multicast data in a wireless access system, the apparatus comprising: a scheduler for scheduling multicast packets and outputting changed information if a change of resource allocation information is necessary for each multicast ID; and a resource allocation message generator for generating, upon receipt of information of a user group using the multicast ID from the scheduler, a second multicast resource allocation message including the received user group information and generating, upon receipt of information transmitted in common to users of the user group, a fast multicast resource allocation message including the information transmitted in common, wherein the second multicast resource allocation message includes at least one of a Header field that indicates the type of the resource allocation message, a MulticastID field that indicates an index representing a user group receiving the same multicast data, a Media Access Control ID (MACID) field that indicates an ID managed by a base station for discrimination between users of the user group, a MACID flag field that represents an indicator for indicating the new allocation or the deallocation of a MACID allocated to a multicast ID, and a Cyclic Redundancy Check (CRC) field that is used to check if there is a channel decoding error.

9. The apparatus of claim 8, wherein the second multicast resource allocation message includes a plurality of MACIDs for the multicast ID.

10. The apparatus of claim 9, wherein the resource allocation message generator transmits a dummy MACID indicating 'No User' in a MACID remaining after allocation of transmit (TX) MACIDs, if the number of TX MACIDs to be transmitted is less than the number of MACIDs transmittable through the second multicast resource allocation message.

11. The apparatus of claim 8, wherein the first multicast resource allocation message includes at least one of a Header field that indicates the type of the resource allocation message, a MulticastID field that indicates an index representing a user group receiving the same multicast data, a MulticastID_reset field that indicates whether to reset all MACIDs belonging to a multicast ID, an Original_Header field that is used to discriminate between the types of multicast resource allocation messages and corresponds to a header field for unicast communication, a NodeID field that indicates a communication resource ID, a Packet Format (PF) field that indicates information about the combination of operation modes of data transmitted through the communication resources, a Duration field that indicates the duration of resource allocation, an Extended Transmission field that indicates the size of a resource allocation unit, a Reserved field that indicates dummy bits used to equalize the total message length in case of a component change in a resource allocation message block, and a CRC field that is used to determine if there is a channel decoding error.

12. The apparatus of claim 11, wherein the operation mode information includes at least one of a channel coding type, a coding rate, a modulation scheme, a packet length, a Hybrid Automatic Repeat Request (HARQ) type, and a Multi-Input Multi-Output (MIMO) scheme.

13. The apparatus of claim 8, wherein the information change for the user group of the multicast ID is at least one of the information change for allocation of a new user for the multicast ID and the information change for deallocation of an allocated user.

14. The apparatus of claim 8, wherein the change of the information transmitted in common is at least one of the information change for the first resource allocation to the multicast ID and the information change for a change of one or more of a Packet Format (PF) and ID of an allocated resource.

* * * * *